United States Patent

[19] Schmidt

[11] Patent Number: 5,931,757
[45] Date of Patent: Aug. 3, 1999

[54] TWO-MODE, COMPOUND-SPLIT ELECTRO-MECHANICAL VEHICULAR TRANSMISSION

[75] Inventor: Michael Roland Schmidt, Carmel, Ind.

[73] Assignee: General Motors Corporation, Detroit, Mich.

[21] Appl. No.: 09/103,850

[22] Filed: Jun. 24, 1998

[51] Int. Cl.$^6$ ........................................................ F16H 3/72
[52] U.S. Cl. ..................................................... 475/2; 475/5
[58] Field of Search ............................................. 475/2, 5

[56] References Cited

U.S. PATENT DOCUMENTS

| | | | |
|---|---|---|---|
| 3,699,351 | 10/1972 | Addie | 475/2 |
| 5,419,406 | 5/1995 | Kawamoto et al. | 475/5 |
| 5,509,491 | 4/1996 | Hall, III | 475/5 |
| 5,558,589 | 9/1996 | Schmidt | 475/5 |
| 5,577,973 | 11/1996 | Schmidt | 475/5 |

*Primary Examiner*—Dirk Wright
*Attorney, Agent, or Firm*—Donald F. Scherer; Dean L. Ellis

[57] ABSTRACT

A two-mode, compound-split, electro-mechanical transmission utilizing an input member for receiving power from an engine, and an output member for delivering power from the transmission. First and second motor/generators are operatively connected to an energy storage device through a control for interchanging electrical power among the storage means, the first motor/generator and the second motor/generator. The transmission employs three planetary gear subsets which are coaxially aligned. Each planetary gear arrangement utilizes first and second gear members, and each first and second gear members meshingly engage a plurality of planet gears rotatably mounted on a carrier. The first and second motor/generators are coaxially aligned with each other as well as the three planetary gear subsets which are circumscribed by the first and second motor/generators. At least one of the gear members in the first or second planetary gear subsets is connected to the first motor/generator. Another gear member in the first or second planetary gear arrangement is connected to the second motor/generator. The carriers are operatively connected to the output member. One of the gear members of the first or second planetary gear subsets is continuously connected to one of the gear members in the third planetary gear subset. Another gear member of the first or second planetary gear subset is operatively connected to the input member, and one gear member of the third planetary gear subset is selectively connected to ground.

17 Claims, 6 Drawing Sheets

TWO-MODE, COMPOUND-SPLIT ELECTRO-MECHANICAL VEHICULAR TRANSMISSION

TECHNICAL FIELD

The present invention relates generally to vehicular transmissions. More particularly, the present invention relates to vehicular transmissions that are capable of receiving input power from an engine as well as a source of stored electrical energy—either selectively or in combination. Specifically, the present invention relates to a two-mode, compound-split, electro-mechanical vehicular transmission that utilizes three interactive planetary gear arrangements that are operatively connected to an engine and two motor/generators that may be annularly configured. The planetary gear arrangements as well as the two motor/generators are disposed coaxially with the planetary gear arrangements located radially inwardly of the motor/generators. The planetary gear arrangements provide two modes, or gear trains, that are selectively available, as by the utilization of only two torque transfer devices, to transmit power from the engine and/or the motor/generators to the output member of the transmission, depending upon the desired, or required, power and/or speed to be delivered by the output shaft. The transmission incorporates at least one mechanical point in its first mode of operation and at least two mechanical points in its second mode of operation.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

A series propulsion system is a system in which energy follows a path from an engine to an electric storage device and then to an electrical motor which applies power to rotate the drive members. There is no direct mechanical connection between the engine and the drive members in a series propulsion system.

Transmissions adapted to receive the output power from either an engine or an electric motor, or both, have heretofore relied largely on what has been designated as series, hybrid propulsion systems. Such systems are designed with auxiliary power units (APU's) of relatively low power for minimum emissions and best fuel economy. However, such combinations of small APU's and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e.: low speed start/stop duty cycles—as well as the benefits of a parallel hybrid transmission for high-average output power, high speed duty cycles. In a parallel arrangement the power supplied by the engine and the power supplied by the source of electrical energy are independently connected to the drive members.

Moreover, perfecting a concept wherein two modes, or gear trains, are available for synchronous selection by the on-board computer to transmit power from the engine and/or the motor/generator to the output shaft results in a hybrid transmission having an extremely wide range of applications.

The desired beneficial results may be accomplished by the use of a variable, two-mode, input-split, parallel, hybrid electro-mechanical transmission. Such a transmission utilizes an input member to receive power from the vehicle engine and a power output member to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electro-mechanical transmission also employs at least one planetary gear set. The planetary gear set has an inner gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. Heretofore, in one mode the output speed of the transmission is generally proportional to the speed of one motor/generator, and in the second mode the output speed of the transmission is generally proportional to the speed of the other motor/generator.

In some embodiments of the variable, two-mode, input-split, parallel, hybrid electro-mechanical transmission, a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

With reference, again, to a simple planetary gear set, the planet gear members are normally supported for rotation on a carrier that is itself rotatable. When the sun gear is held stationary and power is applied to the ring gear, the planet gear members rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

As successful as variable, two-mode, input-split, parallel, hybrid electro-mechanical transmissions are, to date only one prior art patent discloses an arrangement wherein a "mechanical point" exists in the first mode and two mechanical points exist in the second mode. That arrangement is disclosed in U.S. Pat. No. 5,558,589 which issued on Sept. 24, 1996, to General Motors Corporation.

A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point—i.e.: stationary. In variable, two-mode, input-split, parallel, hybrid electro-mechanical transmissions, however, there is typically one point in the second mode at which one of the motor/generators is not rotating such that all the engine power is transferred mechanically to the output. In the aforesaid U.S. Pat. No. 5,558,589, there are two mechanical points in the second mode as well as one mechanical point in the first mode.

However, the prior art does not teach or suggest any transmission configuration wherein the aforesaid desirable characteristics are accomplished by an arrangement wherein the variable, two-mode, input-split, parallel, hybrid electro-mechanical transmission as well as the two motor/generators are coaxially disposed and the motor/generators are each configured as an annulus which circumscribes one or more of the planetary gear arrangements such that the planetary gear arrangements are disposed radially inwardly of the motor/generators.

SUMMARY OF THE INVENTION

It is, therefore, a primary object of the present invention to provide a novel, two-mode, compound-split, electro-mechanical transmission that provides the desired high efficiency sought for continuous, constant-speed operation as well as high-average power applications while operating with at least one mechanical point in the first mode and at least two mechanical points in the second mode—i.e.: three mechanical points, one at each of three separate vehicle speeds.

It is another object of the present invention to provide a novel transmission, as above, wherein the planetary gear arrangements and the motor/generators are coaxially disposed.

It is a further object of the present invention to provide a novel transmission, as above, wherein the planetary gear arrangements are disposed radially inwardly of the annularly configured motor/generators to minimize the envelope—i.e.: at least the circumferential dimension—of the transmission.

It is still another object of the present invention to provide a novel transmission, as above, wherein said operational results can be achieved with three simple planetary gear sets.

It is yet another object of the present invention to provide a novel transmission, as above, by which said operational results can also be achieved by compounding two planetary gear subsets into a Ravigneaux arrangement wherein a common ring gear is employed with compounded planet gears mounted on a common carrier to engage the separate sun gears of the two planetary gear subsets.

It is an even further object of the present invention to provide a novel transmission, as above, wherein only two torque transfer devices are required to operate the transmission.

These and other objects of the invention, as well as the advantages thereof over existing and prior art forms, which will be apparent in view of the following detailed specification, are accomplished by means hereinafter described and claimed.

By way of a general introductory description, a two-mode, compound-split, electro-mechanical transmission embodying the concepts of the present invention utilizes an input member for receiving power from a prime mover power source and an output member for delivering power from the transmission. First and second motor/generators are operatively connected to an energy storage means for interchanging electrical power between the storage means and the first and second motor/generators. A control means is provided for regulating the electrical power interchange between the energy storage means and the first and second motor/generators. The control means also regulates electrical power interchange between the first and second motor/generators.

It is particularly important to recognize that the subject transmission employs three planetary gear subsets which are coaxially aligned. Each planetary gear arrangement utilizes first and second gear members, and each first and second gear members meshingly engage a plurality of planet gears. The first and second motor/generators are coaxially aligned with each other as well as the three planetary gear subsets which are circumscribed by the first and second motor/generators.

At least one of the gear members in the first or second planetary gear subsets is connected to the first motor/generator. At least one of the gear members in the first or second planetary gear subsets is connected to the second motor/generator. The planet gears of the first, second and third planetary gear subsets are mounted on carriers that are operatively connected to the output member. One of the gear members of the first or second planetary gear subsets not connected to the first motor/generator is continuously connected to one of the gear members in the third planetary gear subset. The other gear member of the first or second planetary gear subset not connected to the first motor/generator is operatively connected to the input member, and that gear member of the third planetary gear subset not connected to either the first or second planetary gear subset is selectively connected to ground.

To acquaint persons skilled in the arts most closely related to the present invention, two alternative embodiments of a two-mode, compound-split, electro-mechanical transmission that illustrate two representative structural arrangements now contemplated for putting the invention into practice are described herein by, and with reference to, the annexed drawings that form a part of the specification. The exemplary two-mode, compound-split, electro-mechanical transmissions are described in detail without attempting to show all of the various forms and modifications in which the invention might be embodied. As such, the embodiments shown and described herein are illustrative, and as will become apparent to those skilled in these arts can be modified in numerous ways within the spirit and scope of the invention; the invention being measured by the appended claims and not by the details of the specification.

DESCRIPTION OF THE PREFERRED EMBODIMENT

Figure 1:
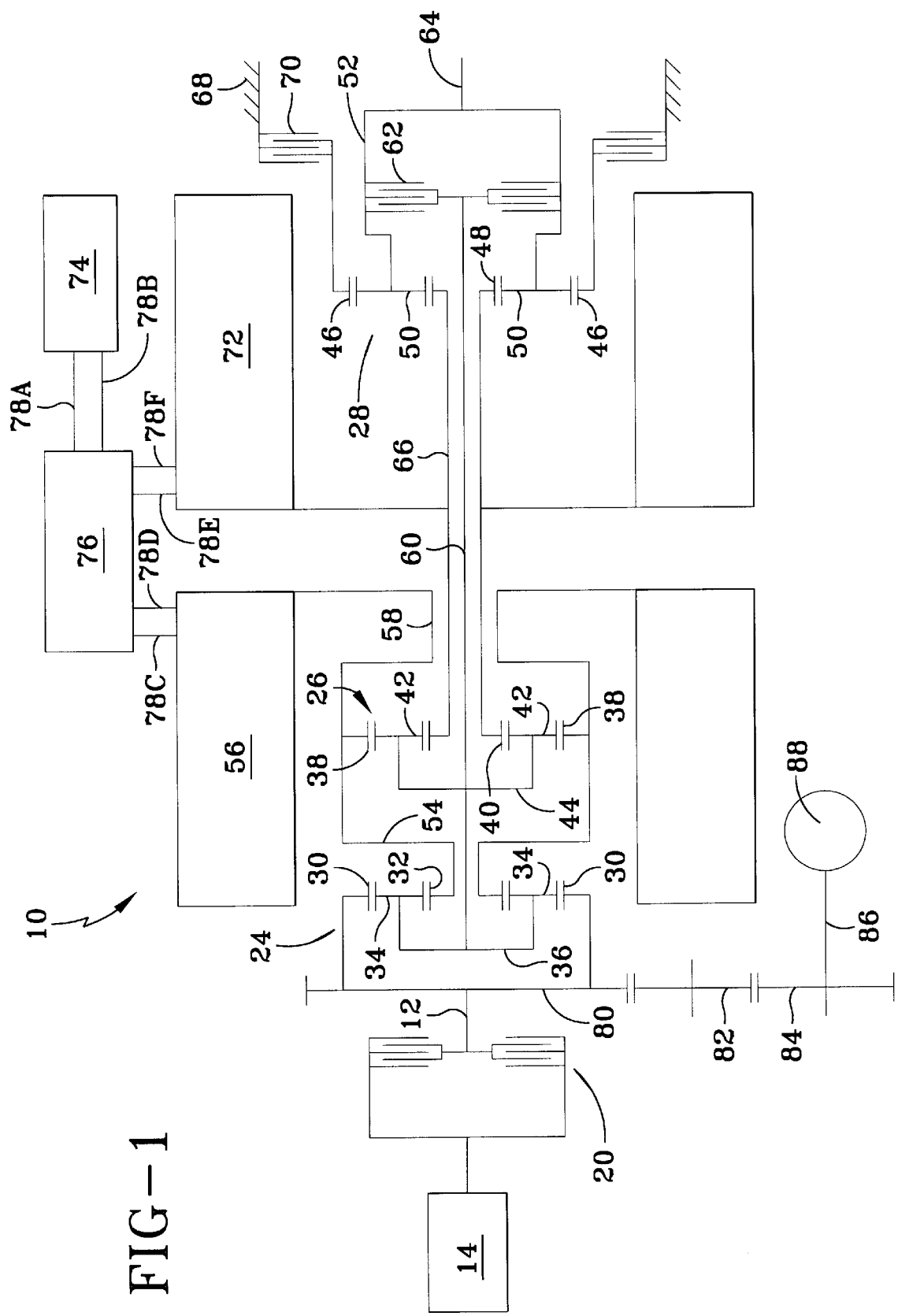
FIG. 1 is a schematic representation of one preferred form of a two-mode, compound-split, electro-mechanical transmission embodying the concepts of the present invention.
Figure 2:
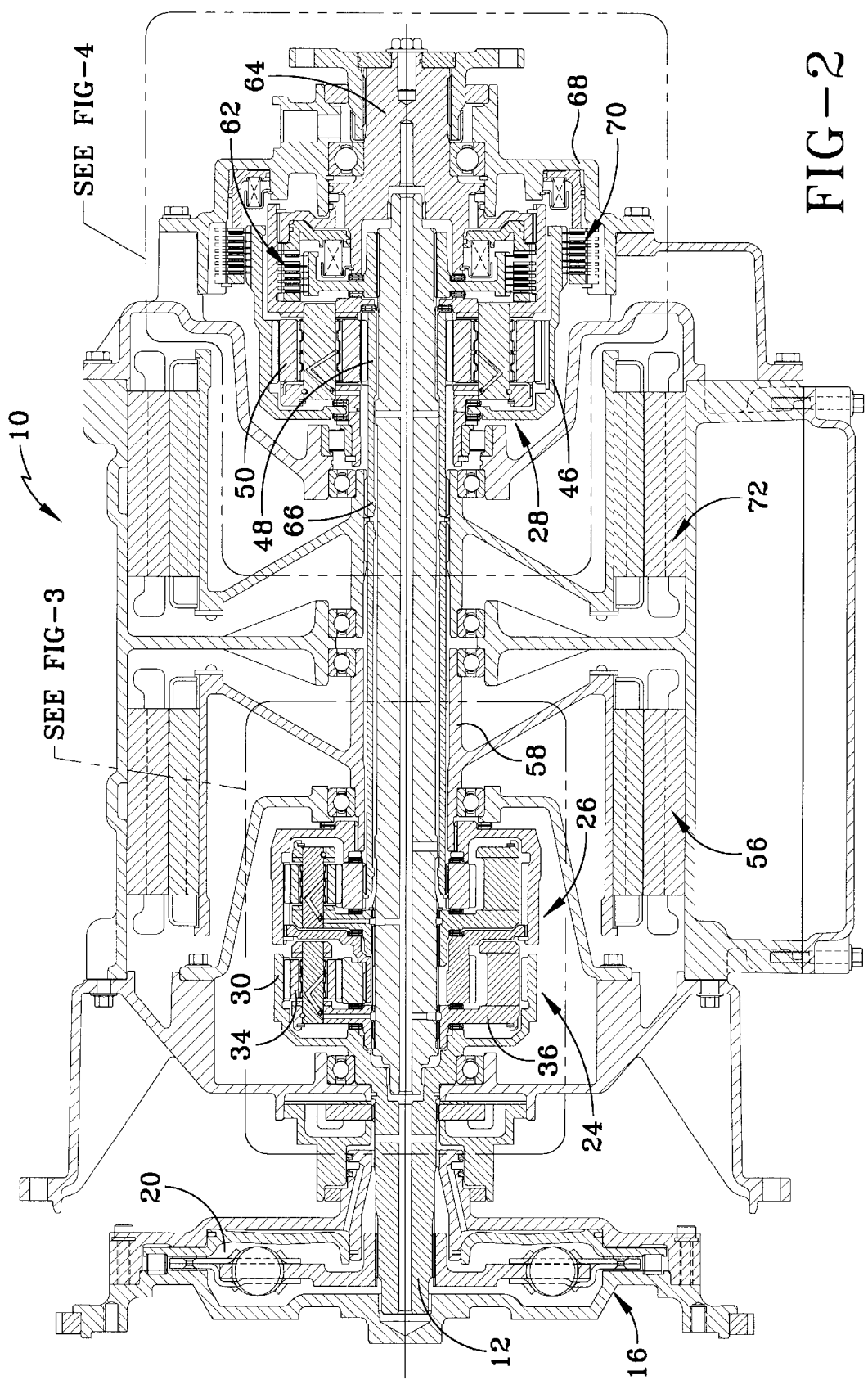
FIG. 2 is a diagrammatic representation of the preferred embodiment depicted in FIG. 1.
Figure 3:
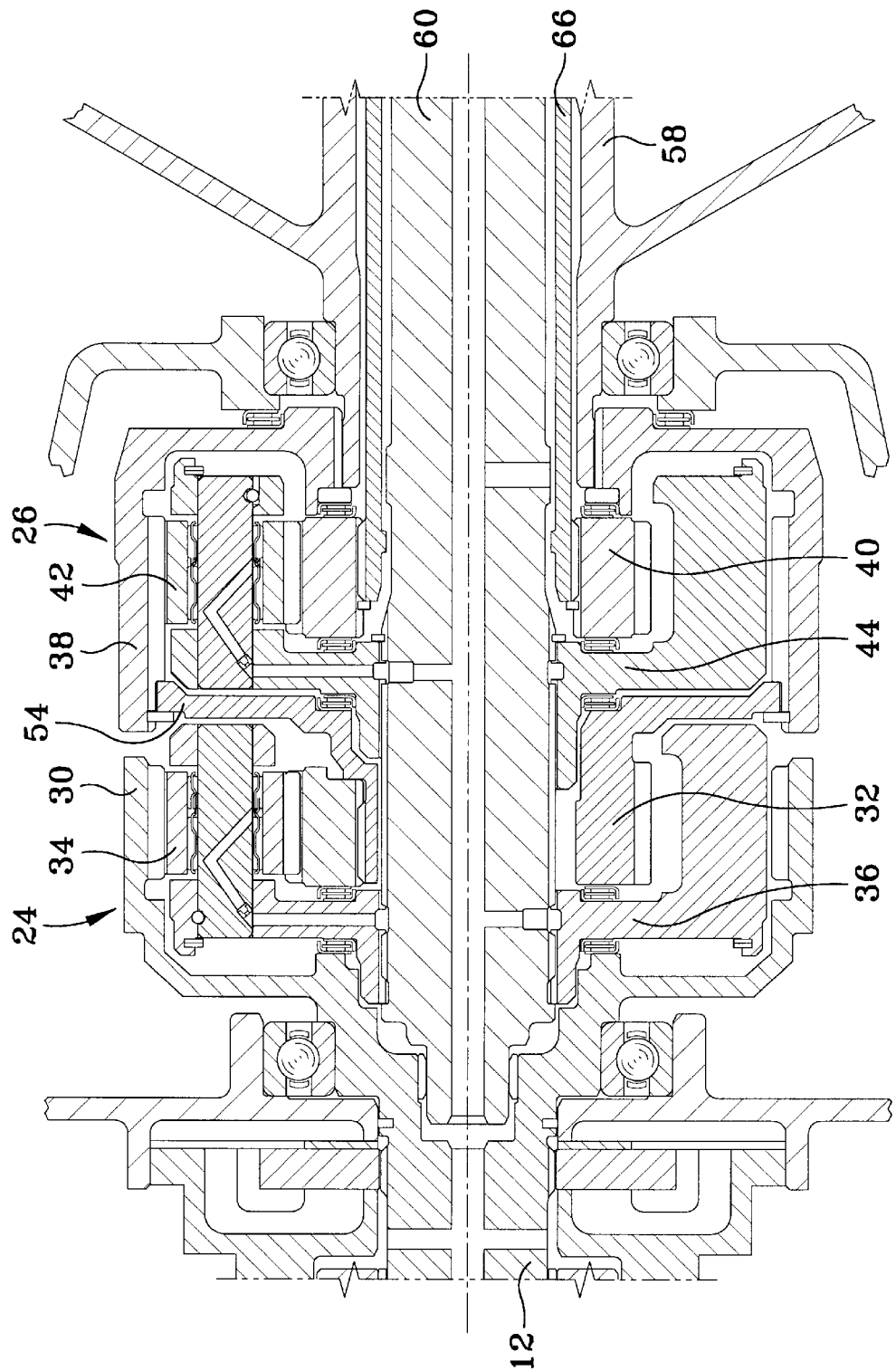
FIG. 3 is an enlarged diagrammatic representation of that portion of FIG. 2 defined by the chain-line rectangle designated as "SEE FIG-3;"
Figure 4:
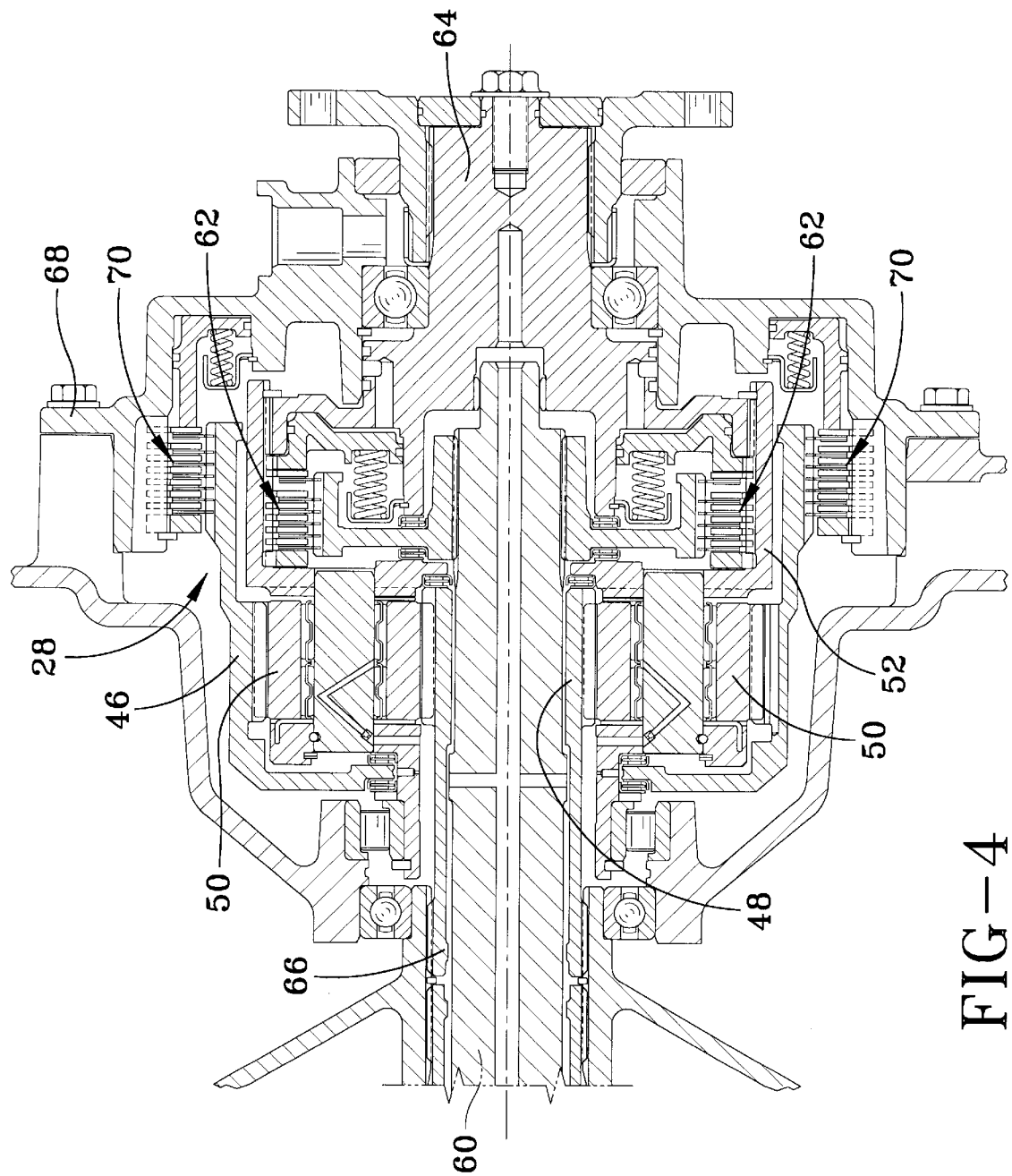
FIG. 4 is an enlarged diagrammatic representation of that portion of FIG. 2 defined by the chain-line rectangle designated as "SEE FIG;"

One representative form of a two-mode, compound-split, electro-mechanical transmission embodying the concepts of the present invention is designated generally by the numeral 10 on the accompanying drawings, and that preferred form of the transmission is depicted in FIGS. 1 through 4, inclusive. With particular reference, then, to those figures, the hybrid transmission 10 has an input member 12 that may be in the nature of a shaft which may be directly driven by an engine 14, or, as shown in FIG. 2, a transient torque damper 16 may be incorporated between the output shaft 18 of the engine 14 and the input member 12 of the hybrid transmission 10. An excellent example of a transient torque damper of the type recommended for the present usage is disclosed in detail in U.S. Pat. No. 5,009,301 which issued on Apr. 23, 1991, to General Motors Corporation. The transient torque damper 16 may incorporate, or be employed in conjunction with, a torque transfer device 20 (FIG. 1) to permit selective engagement of the engine 14 with the hybrid transmission 10, but it must be understood that the torque transfer device 20 is not utilized to change, or control, the mode in which the hybrid transmission 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1–4 are directed, the engine 14 can—after start-up, and during the majority of its input—operate at a constant speed of approximately 2000 RPM, as represented by curve 22 on FIG. 5. Although it must be understood that the speed and horsepower output of the engine 14 is not critical to the invention, for the purpose of effecting an absolutely clear understanding of the hybrid transmission 10, an available output of about 97 horsepower from engine 14 will be assumed for the description of an exemplary installation. Irrespective of the means by which the engine 14 is connected to the input member 12 of the transmission 10, the input member 12 is connected to a planetary gear subset 24 in the transmission 10.

The hybrid transmission 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the hybrid transmission 10.

The carrier 32 of the third planetary gear subset 28 is connected directly to the transmission output member 64. When the hybrid transmission 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72. All the planetary gear subsets 24, 26 and 28 as well as the two motor/generators 56 and 72 are coaxially oriented, as about the axially disposed shaft 60. It should be noted that both motor/generators 56 and 72 are of an annular configuration which permits them to circumscribe the three planetary gear subsets 24, 26 and 28 such that the planetary gear subsets 24, 26 and 28 are disposed radially inwardly of the motor/generators 56 and 72. This configuration assures that the overall envelope—i.e.: the circumferential dimension—of the transmission 10 is minimized.

As was previously herein explained in conjunction with the description of the engine 14, it must similarly be understood that the rotational speed and horsepower output of the first and second motor/generators 56 and 72 are also not critical to the invention, but for the purpose of effecting an absolutely clear understanding of the hybrid transmission 10 a maximum speed of about 5000 RPM for motor/generators having a continuous rating of about 100 horsepower will be assumed for description of an exemplary device.

As should be apparent from the foregoing description, and with particular reference to FIGS. 1 and 2, the transmission 10 selectively receives power from the engine 14. As will now be explained, the hybrid transmission also receives power from an electric storage device 74. The electric storage device 74 may be one or more batteries. Other electric storage devices that have the ability to store electric power and dispense electric power may be used in place of the batteries without altering the concepts of the present invention. As was explained in conjunction with the description of the engine 14 and the motor/generators 56 and 72, it must similarly be understood that the horsepower output of the electrical storage device 74 is also not critical to the invention, but for the purpose of effecting an absolutely clear understanding of the hybrid transmission 10 an output of about 75 horsepower from the electrical storage device 74 will be assumed for description of an exemplary device.

The electric storage device 74 communicates with an electrical control unit (ECU) 76 by transfer conductors 78A and 78B. The ECU 76 communicates with the first motor/generator 56 by transfer conductors 78C and 78D, and the ECU 76 similarly communicates with the second motor/generator 72 by transfer conductors 78E and 78F.

As apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 78, but the specific, individual transfer conductors are, therefore, identified as 78A, 78B, 78C, 78D, 78E and 78F in the specification and on the drawings. This same suffix convention shall be employed throughout the specification.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and/or PTO unit, designated either individually or collectively at 88.

Operation Of The Exemplary Preferred Embodiment

Introduction

The operator of the vehicle has three, well-known, primary devices to control the transmission 10. One of the primary control devices is a well known drive range selector (not shown) that directs the ECU 76 to configure the transmission for either the park, reverse, neutral, or forward drive range. The second and third primary control devices constitute an accelerator pedal (not shown) and a brake pedal (also not shown). The information obtained by the ECU 76 from these three primary control sources will hereinafter be referred to as the "operator demand." The ECU 76 also obtains information from both the first and second motor/generators 56 and 72, respectively, the engine 14 and the electric storage device 84. In response to an operator's action, the ECU 76 determines what is required and then manipulates the selectively operated components of the hybrid transmission 10 appropriately to respond to the operator demand.

For example, in the exemplary embodiment shown in FIGS. 1 and 2, when the operator has selected a forward drive range and manipulates either the accelerator pedal or the brake pedal, the ECU 76 determines if the vehicle should accelerate or decelerate. The ECU 76 also monitors the state of the power sources, and determines the output of the transmission required to effect the desired rate of acceleration or deceleration. Under the direction of the ECU 76 the transmission is capable of providing a range of output speeds from slow to fast in order to meet the operator demand.

In order to provide a full explanation as to the operation of a transmission embodying the concepts of the present invention, a description of the operational modes employed to achieve the output power and speeds necessary to meet the operator demand under various operating conditions will be provided with respect to the first of the preferred embodiments. As such, the following description describes the full power operational states of the particular transmission identified by the numeral 10. Once the overall concepts as to how this preferred embodiment operates are understood, it is to be further recognized that those same concepts likewise apply to the single alternative embodiment, the structure of which is subsequently described herein.

To reiterate, the transmission 10 is a two-mode, compound-split, electro-mechanical, vehicular transmission. In other words, the output member 64 receives power through two distinct gear trains within the transmission 10. A first mode, or gear train, is selected when the torque transfer device 70 is actuated in order to "ground" the outer gear member 46 of the third planetary gear subset 28. A second mode, or gear train, is selected when the torque transfer device 70 is released and the torque transfer device 62 is simultaneously actuated to connect the shaft 60 to the carrier 52 of the third planetary gear subset 28.

Those skilled in the art will appreciate that the ECU 76 serves to provide a range of output speeds from relatively slow to relatively fast within each mode of operation. This combination of two modes with a slow to fast output speed range in each mode allows the transmission 10 to propel a vehicle from a stationary condition to highway speeds while satisfying the other objects of the invention. Additionally, the ECU 76 coordinates operation of the transmission 10 so as to allow synchronized shifts between the modes. As noted, operation of the preferred embodiment will be described as it relates to full power operation inasmuch as that approach will fully describe the general operational concepts.

I. First Mode

In the first mode of operation, and when the ECU 76 has determined that the operator desires to move forwardly from a stationary condition, and to accelerate, the torque transfer device 20 is engaged operatively to connect the engine 14 to the hybrid transmission 10, and torque transfer device 20 remains applied as the vehicle moves forwardly through a speed range hereinafter more fully described. The torque transfer device 62 is not applied, and it remains disengaged. In this situation, the engine 14 applies driving power to the outer gear member 30 of the first planetary gear subset 24 so the outer member 30 rotates in unison with the input member 12 (and thus the engine 14). The first motor/generator 56 simultaneously rotates the inner gear member 32 of the first planetary gear subset 24 and the outer gear member 38 of the second planetary gear subset 26 in the same direction, thus driving the carrier 36 in the same direction—which effects rotation of the inner gear member 40 of the second planetary gear subset 24 in the opposite direction.

The second motor/generator 72 operates as a motor during the first mode, and as such motor/generator 72 drives sleeve shaft 66 in that direction which rotates the inner gear member 48 of the third planetary gear subset 28 to rotate the planet gears 50 of the third planetary gear subset 28 against the outer gear member 46 of the third planetary gear subset 28. The outer gear member 46 is fixed by having been grounded so that the carrier 52 drives the output member 64 in that direction required to effect forward movement of the vehicle.

That rotation of the sleeve shaft 66 effected by rotation of the second motor/generator 72 operating as a motor also rotates the inner gear member 38 of the second planetary gear subset 26. Because the torque transfer device 62 remains disengaged, the carriers 36 and 44 of the first and second planetary gear subsets 24 and 26, respectively, are freely rotatable—but only in unison inasmuch as the two carriers 36 and 44 are compounded. As a result, the rotation of the outer gear member 30 of the first planetary gear subset 24 effected by the engine 14 and the rotation of the inner gear member 40 effected by the second motor/generator 72 force the inner gear member 32 of the first planetary gear subset 24 and the conjoined outer gear member 38 of the second planetary gear subset 26 to drive the first motor/ generator 56 in that direction, and velocity, which causes the first motor/generator 56, at least initially, to serve as a generator.

Figure 5:
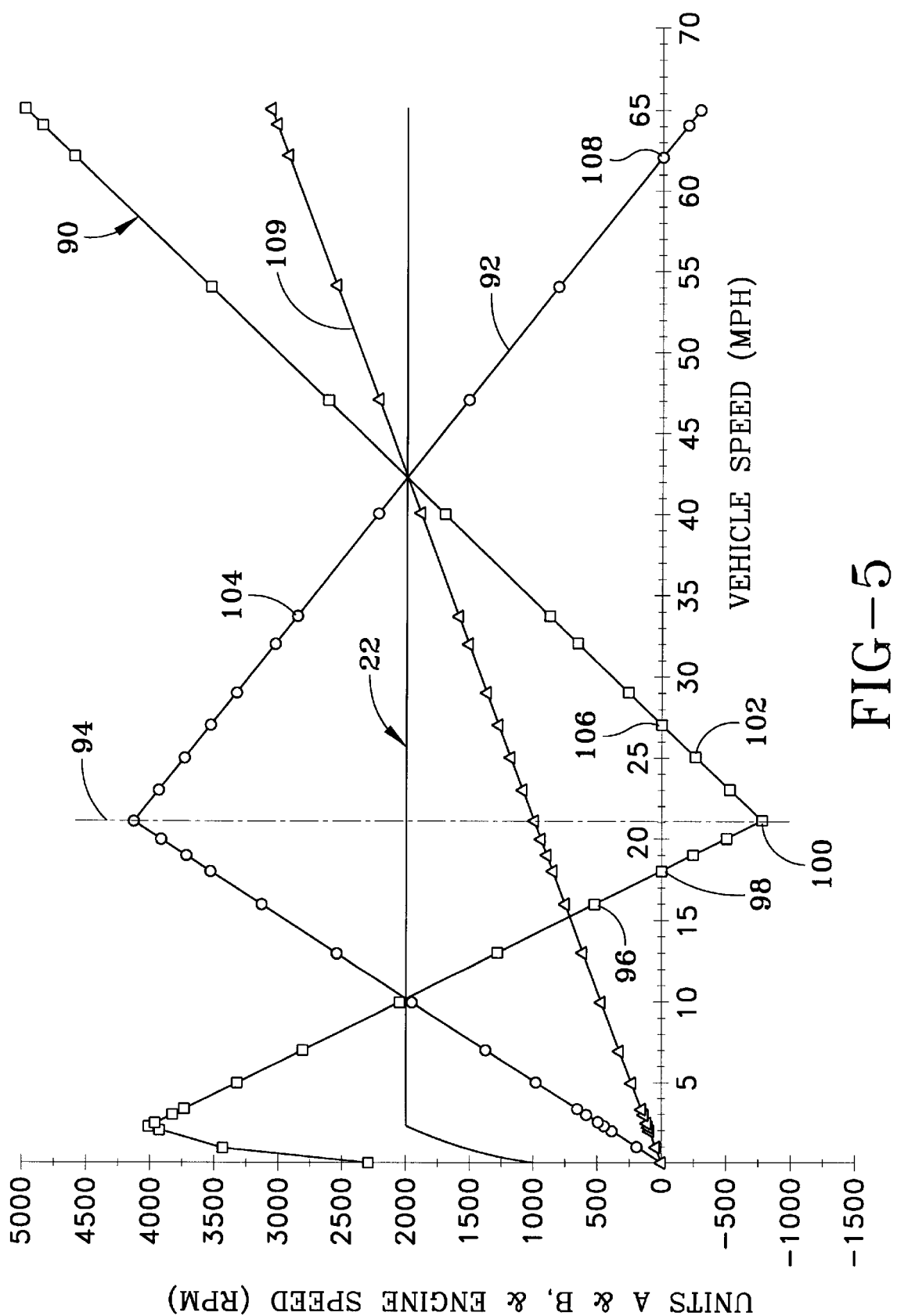
FIG. 5 is a graphical representation of the rotations per minute (RPM) of each motor/generator as well as the engine relative to the speed of the vehicle in miles per hour (MPH) obtained by virtue of the transmission depicted in FIGS. 1–4; and, FIG. 6 is a schematic representation of an alternative form of a two-mode, compound-split, electro-mechanical transmission embodying the concepts of the present invention.

With reference to FIG. 5, curve 22 is the plot of the engine speed in revolutions per minute (RPM) against the speed in miles per hour (MPH) of the vehicle in which the engine 14 and hybrid transmission 10 are incorporated. For convenience, it will be noted that curve 22 is uninterrupted by visual plot points. Curve 90 is the plot of the rotational speed (RPM) of the first motor/generator 56, also relative to the speed (MPH) of the vehicle. This curve may be readily distinguished by the fact that the plot points appear as small squares. Curve 92 is the plot of the rotational speed (RPM) of the second motor/generator 72 relative to the speed (MPH) of the vehicle. This curve may be readily distinguished by the fact that the plot points appear as small circles.

The first operational mode of transmission 10 extends from the abscissa, which designates engine speed (RPM), to line 94 which is drawn parallel to the abscissa and which defines the shift from operation of the transmission 10 in the first mode to the second mode. In the representative embodiment described, the first mode extends from the vehicle at rest to a forward speed on the order of about 21 MPH. At speeds greater than about 21 MPH the transmission operates in the second mode.

As previously noted, the second motor/generator operates as a motor through the entire first mode—i.e.: from zero to about 21 MPH. The first motor/generator 56, however, operates as a generator until approximately 16 MPH— represented by plot point 96 on curve 90—and thereafter operates as a motor within the first mode. The aforesaid transition in the operation of the first motor/generator 56 is the result of the number of teeth on the various gears within the planetary gear subsets which cause the speeds of the two motor/generators to reverse at various operational speeds of the vehicle.

Should one wish to duplicate the results described herein, the outer gear members 30 and 38 in each of the first and second planetary gear subsets 24 and 26 have 115 teeth, and the inner gear members 32 and 40 in each of the first and second planetary gear subsets 24 and 26 have 65 teeth. The outer gear member 46 of the third planetary gear subset 28 has 132 teeth, and the inner gear member 48 of the third planetary gear subset 28 has 42 teeth. With the configuration of the transmission 10 heretofore described, and with the aforesaid number of teeth on the inner and outer gear members, the transmission provides a mechanical point while operating in the first mode. That is, the first motor/ generator 56 has a zero rotational speed at about 18 MPH, as depicted by plot point 98 on curve 90.

To complete the description as to the operation of the motor/generators in the exemplary environment described, one must consider operation of the transmission in the second mode of operation.

II. Second Mode

The transition from the first to the second mode of operation is achieved by disengaging torque transfer device 70 and simultaneously applying torque transfer device 62. At the inception of the second mode of operation, the first motor/generator 56 transitions from operating as a motor to operating as a generator. Inasmuch as the transition from operation of the transmission 10 in the first mode to operation in the second mode occurs at line 94, the transition of the first motor/generator 58 from a motor to a generator occurs at point 100 on curve 90—which also delineates the intersection of the curve 92 with line 94. The first motor/ generator 56 continues to operate as a generator during operation of the transmission 10 in the second mode while the vehicle gains speed from about 21 MPH to about 25 MPH. At about 25 MPH the first motor/generator 56 transitions from operation as a generator back to operation as a motor. This transition is represented as point 102 on curve 90. The first motor/generator 56 continues thereafter to operate as a motor.

At the beginning of the second mode of operation, the second motor/generator 72 continues to operate as a motor. In fact, the second motor/generator 72 operates as a motor until the vehicle reaches a speed of about 33.6 MPH, as represented at plot point 102 on curve 92, at which point it transitions to operation as a generator, and continues thereafter to operate as a generator.

With the configuration of the transmission 10 heretofore described, and with the aforesaid number of teeth on the inner and outer gear members, the transmission 10 provides two mechanical points while operating in the second mode. That is, the first motor/generator 56 has a zero rotational speed at about 27 MPH, as designated by point 106 on curve 90. In addition, the second motor/generator 72 has a zero rotational speed at about 62 MPH, as designated by point 108 on curve 92. Hence, the transmission 10 provides two mechanical points in the second mode of operation.

It should be understood that the exact location of the aforesaid mechanical points is determined not only by the number of teeth on the inner and outer gear members of the planetary gear subsets, but also by the rotational speed of the input shaft 12. Hence, with the number of teeth disclosed for the inner and outer gear members in the first of the exemplary embodiments, an increase in the speed of the input shaft 12 will shift the locations of the mechanical points to higher vehicular speeds, and conversely, a reduction in the speed of the input member 12 will shift the mechanical points to lower vehicular speeds.

III. Reverse Mode

The reverse mode of operation is effected by having the ECU 76 operate the second motor/generator 72 as a motor, but reversing its rotational direction from the direction in which the second motor/generator 72 rotates when the vehicle begins to move forwardly from a stationary position in the first mode of operation.

IV. Summation

A two-mode, compound-split, electro-mechanical transmission such as that identified by the numeral 10, which embodies the concepts of the present invention, provides the desired efficiency during continuous, constant-speed operation of the engine while providing a single mechanical point during operation in the first mode and two mechanical points during operation in the second mode. As represented by curve 109 on FIG. 5, the transmission 10 provides a continuously increasing output speed throughout its entire operational range. The foregoing transmission employs three planetary gear subsets to provide the two-mode operation when operatively controlled by two torque transfer devices. Moreover, the three planetary gear subsets 24, 26 and 28 as well as both motor/generators 56 and 72 are coaxially disposed with the annular motor/generators 56 and 72 circumscribing the three planetary gear subsets 24, 26 and 28 in order to minimize the required envelope—i.e.: circumferential dimension—of the transmission 10.

Alternative Embodiment

Figure 6:
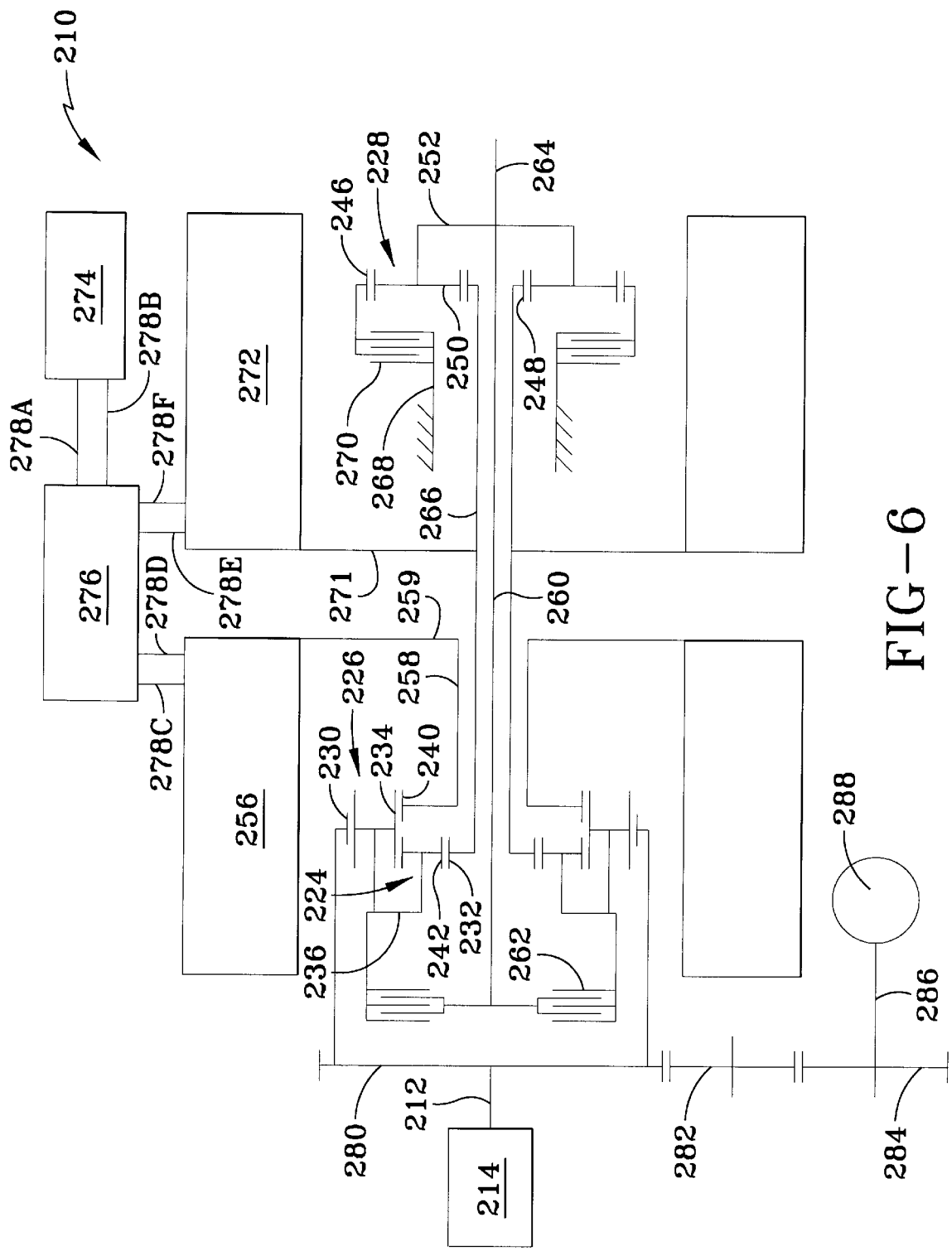

An alternative form of a two-mode, compound-split, electro-mechanical transmission embodying the concepts of the present invention is designated generally by the numeral 210 on FIG. 6 of the accompanying drawings. With particular reference, then, to FIG. 6, the hybrid transmission 210 has an input member 212 that is directly driven by an engine 214. In the alternative embodiment, as well, the engine 214 may be a fossil fuel engine, such as a diesel engine which is readily adapted to provide its available power output delivered at a constant number of revolutions per minute (RPM). In the alternative embodiment to which FIG. 6 is directed, the engine 214 can—after start-up, and during the majority of its input—operate at a constant speed of, for example, approximately 2000 RPM. The input shaft 212 may also be selectively connected to the hybrid transmission 210, but, as shown, the input member 212 may well be the output member of the engine 214.

The hybrid transmission 210 utilizes three planetary gear subsets 224, 226 and 228. The first and second planetary gear subsets 224 and 226 are compounded as a Ravigneaux pair. That is, the planetary gear subsets 224 and 226 share an outer gear member 230, generally designated as the common ring gear, which circumscribes an inner gear member 232 of the first planetary gear subset 224 as well as an inner gear member 240 of the second planetary gear subset 226, each of which are generally designated as sun gears.

A plurality of "long" planet gear members 234 are rotatably mounted on a carrier 236 such that each long planet gear member 234 meshingly engages the common outer gear member 230 as well as a plurality of "short" planet gears members 242 in the first planetary gears subset 224 which are also rotatably mounted on the common carrier 236. The long planet gears 234 also meshingly engage the inner gear member 240 of the second planetary gear subset 226, whereas the short planet gears meshingly engage not only the long planet gears 234 but also the inner gear member 232 of the first planetary gear subset 224.

The third planetary gear subset 228 also has an outer gear member 246, generally designated as the ring gear, which circumscribes an inner gear member 248, generally designated as the sun gear. A plurality of planet gear members 250 are rotatably mounted on a carrier 252 such that each planet gear 250 meshingly engages both the outer gear member 246 and the inner gear member 248.

The planetary gear subsets 224, 226 and 228 are further compounded in that the common carrier 236 of the first and second planetary gear subsets 224 and 226 are conjoined, as through a shaft 260, to the carrier 252 of the third planetary gear subset 228. As such, carriers of all three planetary gear subsets 224, 226 and 228, respectively—i.e.: the common carrier 236 of the first and second planetary gear subsets 224 and 226 as well as the carrier 252 of the third planetary gear subset 228 are conjoined. The inner gear member 240 of the second planetary gear subset 226 is continuously connected to a first motor/generator 256, as by a sleeve shaft 258 which is secured to the output hub 259 of the first motor/generator 256. As shown, the sleeve shaft 258 coaxially circumscribes the shaft 260.

It will be observed that the common carrier 236 is selectively connected to the shaft 260, as by a torque transfer device 262 which, as will be hereinafter more fully explained, is employed to assist in selecting the operational modes of the hybrid transmission 210. It should also be noted that an axial extension 264 of the shaft 260 may constitute the output member of the transmission 210. When the hybrid transmission 210 is used in a land vehicle the output member—in the nature of the axial extension 264— may be connected to the vehicular axles (not shown) that may, in turn, terminate in the drive wheels (also not shown). The drive wheels may be either front or rear wheels of the vehicle on which they are employed, or they may be the drive gear of a track vehicle.

The inner gear member 232 of the first planetary gear subset 224 is connected to the inner gear member 248 of the third planetary gear subset 228, as through a sleeve shaft 266 that circumscribes shaft 260 and is disposed radially inwardly of sleeve shaft 258. The sleeve shaft 266 is also continuously connected to the output hub 271 of a second motor/generator 272. The outer gear member 246 of the third planetary gear subset 228 is selectively connected to ground, represented by the transmission housing 268, through a torque transfer device 270. Torque transfer device 270, as is also hereinafter explained, is also employed to assist in selecting the operational modes of the hybrid transmission 210.

As should be apparent from the foregoing description, and with particular reference to FIG. 6, the transmission 210 selectively receives power from the engine 214. As will now be explained, the hybrid transmission also receives power from an electric storage device 274. The electric storage device 274 may be one or more batteries. Other electric storage devices that have the ability to store electric power and dispense electric power may be used in place of the batteries without altering the concepts of the present invention. As was explained in conjunction with the description of the engine 214 and the motor/generators 256 and 272, it must similarly be understood that the horsepower output of the electrical storage device 274 is also not critical to the invention.

The electric storage device 274 communicates with an electrical control unit (ECU) 276 by transfer conductors 278A and 278B. The ECU 276 communicates with the first motor/generator 256 by transfer conductors 278C and 278D, and the ECU 276 similarly communicates with the second motor/generator 272 by transfer conductors 278E and 278F.

A drive gear 280 may be presented from the input member 212. As depicted, the drive gear 280 fixedly connects the input member 212 to the common outer gear member 230 of the conjoined first and second planetary gear subsets 224 and 226, and the drive gear 280, therefore, receives power from the engine 214 and/or the motor/generators 256 and/or 272. The drive gear 280 meshingly engages an idler gear 282 which, in turn, meshingly engages a transfer gear 284 that is secured to one end of a shaft 286. The other end of the shaft 286 may be secured to a transmission fluid pump and/or PTO unit, designated either individually or collectively at 288.

Operation Of The Alternative Embodiment

As in the exemplary preferred embodiment 10, the ECU 276 determines operation of the transmission 210 by "operator demand," and the first and second modes may be a duplication of those achieved by transmission 10. That is, engagement of the torque transfer device 270 with the torque transfer device 262 remaining disengaged effects operation in the first mode. The simultaneous engagement of torque transfer device 262 and disengagement of torque transfer device 270 effects a transition from operation in the first mode to operation in the second mode. The alternative embodiment of transmission 210 also provides a mechanical point during operation in the first mode and two mechanical points during operation in the second mode.

These objectives are also achieved by a transmission that employs three planetary gear subsets 224, 226 and 228 that are coaxially disposed with respect to each other as well as with respect to both motor/generators 256 and 272. Here, too, the motor/generators may be of annular configuration such that they circumscribe the three planetary gear subsets 224, 226 and 228 in order to minimize the envelope—i.e.: the circumferential dimension—of the transmission 210.

Conclusion

While only a preferred, and one alternative, embodiment of the present invention are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention not only teaches that a transmission embodying the concepts of the present invention is capable of providing high overall efficiency, particularly at high output speeds, but also that the other objects of the invention can likewise be accomplished.

I claim:

1. A two-mode compound split hybrid electro-mechanical transmission, comprising:

an input member for receiving power from a prime mover power source;

an output member for delivering power from the transmission;

first and second motor/generators;

energy storage means for interchanging electrical power between said storage means and said first and second motor/generators;

control means for regulating the electrical power interchange between said energy storage means and said first and second motor/generators and also for regulating electrical power interchange between said first and second motor/generators;

three coaxially aligned planetary gear arrangements;

each planetary gear arrangement utilizing first and second gear members;

said first and second gear members of each planetary gear arrangement meshingly engaging a plurality of planet gears mounted on a carrier incorporated in each corresponding planetary gear arrangement;

said first and second motor/generators being coaxially aligned with each other and with said three planetary gear arrangements;

at least one of said gear members in said first or second planetary gear arrangement connected to said first motor/generator;

at least one of said gear members in said first or second planetary gear arrangement connected to said second motor/generator;

means operatively to connect said carriers associated with said first, second and third planetary gear arrangements to each other and to said output member;

one of the gear members of said first or second planetary gear arrangements not connected to said first motor/generator being continuously connected to one of said gear members in said third planetary gear arrangement;

the other gear member of said first or second planetary gear arrangement not connected to said first motor/generator being operatively connected to said input member; and that said gear member of said third planetary gear arrangement not connected together said first or second planetary gear arrangement being selectively connected to ground.

2. An electro-mechanical transmission, as set forth in claim 1, further comprising:

a torque transfer device selectively connecting the planet gears in said third planetary gear arrangement to said planet gears in said first and second planetary gear arrangements.

3. An electro-mechanical transmission, as set forth in claim 2, wherein:

said first and second motor/generators annularly circumscribe said coaxially disposed planetary gear arrangements.

4. An electro-mechanical transmission, as set forth in claim 3, wherein:

said planetary gear arrangements are disposed radially inwardly of said first and second motor/generators.

5. A two-mode compound split hybrid electro-mechanical transmission, comprising:

an input member for receiving power from a prime mover power source;

an output member for delivering power from the transmission;

first and second motor/generators;

energy storage means for interchanging electrical power between said storage means and said first and second motor/generators;

control means for regulating the electrical power interchange between said energy storage means and said first and second motor/generators and also for regulating electrical power interchange between said first and second motor/generators;

three coaxially aligned planetary gear arrangements;

each planetary gear arrangement utilizing first and second gear members;

said first and second gear members of each planetary gear arrangement meshingly engaging a plurality of planet gears mounted on a carrier incorporated in each corresponding planetary gear arrangement;

said first and second motor/generators being coaxially aligned with each other and with said three planetary gear arrangements;

at least one of said gear members in said first and second planetary gear arrangements connected to said first motor/generator;

at least one of said gear members in said first or second planetary gear arrangement connected to said second motor/generator;

means operatively to connect said carriers associated with said first, second and third planetary gear arrangements to each other and to said output member;

one of the gear members of said first or second planetary gear arrangements not connected to said first motor/generator being continuously connected to one of said gear members in said third planetary gear arrangement;

the other gear member of said first or second planetary gear arrangement not connected to said first motor/generator being operatively connected to said input member; and, that said gear member of said third planetary gear arrangement not connected to either said first or second planetary gear arrangement being selectively connected to ground.

6. An electro-mechanical transmission, as set forth in claim 5, wherein:

said planet gears in said first and second planetary gear arrangements are selectively connected to said planet gears in said third planetary gear arrangement;

said planet gears in said third planetary gear arrangement are continuously connected to said output member.

7. An electro-mechanical transmission, as set forth in claim 6, wherein:

said first and second motor/generators annularly circumscribe said coaxially disposed planetary gear arrangements.

8. An electro-mechanical transmission, as set forth in claim 7, wherein:

said planetary gear arrangements are disposed radially inwardly of said first and second motor/generators.

9. An electro-mechanical transmission, as set forth in claim 1, further comprising:

a torque transfer device selectively connecting said input member to said engine.

10. A two-mode compound split hybrid electro-mechanical transmission, comprising:

an input member for receiving power from a prime mover power source;

an output member for delivering power from the transmission;

first and second motor/generators;

energy storage means for interchanging electrical power between said storage means and said first and second motor/generators;

control means for regulating the electrical power interchange between said energy storage means and said first and second motor/generators and also regulating electrical power interchange between said first and second motor/generators;

three coaxially aligned planetary gear arrangements;

each planetary gear arrangement utilizing first and second gear members;

said first and second gear members of each planetary gear arrangement meshingly engaging a plurality of planet gears mounted on a carrier incorporated in each corresponding planetary gear arrangement;

said first and second motor/generators being coaxially aligned with each other and with said three planetary gear arrangements;

at least one of said gear members in said first or second planetary gear arrangement connected to said first motor/generator;

at least one of said gear members in said first or second planetary gear arrangement connected to said second motor/generator;

said carriers in said first and second planetary gear arrangements selectively connected to said carrier in said third planetary gear arrangement;

said carrier in said third planetary gear arrangement continuously connected to said output member;

one of the gear members of said first or second planetary gear arrangements not connected to said first motor/generator being continuously connected to one of said gear members in said third planetary gear arrangement;

the other gear member of said first or second planetary gear arrangement not connected to said first motor/generator being operatively connected to said input member; and, that said gear member of said third planetary gear arrangement not connected to either said first or second planetary gear arrangement being selectively connected to ground.

11. An electro-mechanical transmission, as set forth in claim 10, wherein:

said first and second motor/generators annularly circumscribe said coaxially disposed planetary gear arrangements.

12. An electro-mechanical transmission, as set forth in claim 11, wherein:

said planetary gear arrangements are disposed radially inwardly of said first and second motor/generators.

13. An electro-mechanical transmission, as set forth in claim 10, further comprising:

a single carrier rotatably supporting said planet gears of said first and second planetary gear arrangement;

a torque transfer device selectively connecting said single carrier to said output member.

14. An electro-mechanical transmission, as set forth in claim 13, wherein:

said gear member in said first and second planetary gear arrangement meshingly engaging said planet gears of said first and second planetary gear arrangement is a single ring gear.

15. An electro-mechanical transmission, as set forth in claim 14, wherein:

said single ring gear is operatively connected to said input member;

said gear members of said first and second planetary gear arrangements not connected to said input member being sun gears.

16. An electro-mechanical transmission, as set forth in claim 15, wherein:

that gear member of said third planetary gear arrangement not selectively connected to ground being a sun gear;

said sun gear in said first planetary gear arrangement is continuously connected to said sun gear in said second planetary gear arrangement.

17. A two-mode compound split hybrid electro-mechanical transmission, comprising:

an input member for receiving power from a prime mover power source;

an output member for delivering power from the transmission;

first and second motor/generators;

energy storage means for interchanging electrical power between said storage means and said first and second motor/generators;

control means for regulating the electrical power interchange between said energy storage means and said first and second motor/generators and also regulating electrical power interchange between said first and second motor/generators;

three coaxially aligned planetary gear members including first, second and third simple planetary gear sets, each simple planetary gear set including a sun gear member, a ring gear member and a planetary carrier assembly rotatably supporting a plurality of planet gears;

said first and second motor/generators being coaxially aligned with each other and with said three simple planetary gear sets;

said ring gear of said first planetary gear set being operatively connected with said input member;

said ring gear of said second planetary gear set being operatively connected with said first motor/generator and said sun gear of said first planetary gear set;

said sun gear of the said first planetary gear set being continuously connected to said second motor/generator as well as said sun gear of said third planetary gear set;

said ring gear of said third planetary gear set being selectively connected to ground;

said planet gears of said third planetary gear set being continuously connected to said output member; and, said planet gears of said first and second planetary gear sets being selectively connected to said planet gears of said third planetary gear set.

\* \* \* \* \*